# (12) United States Patent
Yamaguchi

(10) Patent No.: US 11,468,405 B2
(45) Date of Patent: Oct. 11, 2022

(54) INFORMATION PROCESSING DEVICE, OPTIMIZATION METHOD, AND NON-TRANSITORY COMPUTER-READABLE STORAGE MEDIUM FOR STORING OPTIMIZATION PROGRAM

(71) Applicant: FUJITSU LIMITED, Kawasaki (JP)

(72) Inventor: Hideshi Yamaguchi, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/244,999

(22) Filed: Apr. 30, 2021

(65) Prior Publication Data

US 2022/0051176 A1 Feb. 17, 2022

(30) Foreign Application Priority Data

Aug. 17, 2020 (JP) .............................. JP2020-137654

(51) Int. Cl.
*G06Q 10/08* (2012.01)
*B65G 67/02* (2006.01)

(52) U.S. Cl.
CPC .................................. *G06Q 10/087* (2013.01)

(58) Field of Classification Search
CPC ........... G06Q 10/087; G06Q 10/06315; G06Q 50/28; G06Q 10/0832; B65G 1/04; B65G 1/1373; B65G 43/08; B65G 67/02; B65G 67/603; G06F 17/18
USPC ......................................................... 705/28
See application file for complete search history.

(56) References Cited

U.S. PATENT DOCUMENTS

| 7,155,406 | B2 * | 12/2006 | Kang ................. G06Q 10/0875 705/28 |
| 2018/0040092 | A1 * | 2/2018 | Valtanen ................. B65G 67/02 |
| 2020/0082323 | A1 * | 3/2020 | Heise ............... G08G 1/096827 |
| 2021/0334745 | A1 * | 10/2021 | Nomura ............. G06Q 10/0832 |

FOREIGN PATENT DOCUMENTS

| JP | H01-127526 A | 5/1989 |
| JP | H10-305929 A | 11/1998 |
| JP | 2003-173366 A | 6/2003 |
| JP | 2005-112609 A | 4/2005 |

OTHER PUBLICATIONS

Extended European Search Report dated Oct. 4, 2021 for corresponding European Patent Application No. 21171172.6, 7 pages.

* cited by examiner

*Primary Examiner* — Garcia Ade
(74) *Attorney, Agent, or Firm* — Fujitsu Patent Center

(57) ABSTRACT

An optimization method includes: receiving space information regarding sections, a route between sections, and a route from each section to an entrance for a target space; setting a coefficient used to change a maximum load capacity of a cargo to be arranged in each region included in each section; generating a first constraint condition indicating that another cargo does not exist on the route from a cargo to be loaded or to be unloaded to the entrance at the time when the cargo is loaded and unloaded, a second constraint condition indicating the number of cargoes to be loaded and the number of cargoes to be unloaded calculated using the coefficient, and a third constraint condition indicating the maximum load capacity calculated using the coefficient; and determining cargo arrangement in the target space based on the first and second and third constraint conditions.

6 Claims, 12 Drawing Sheets

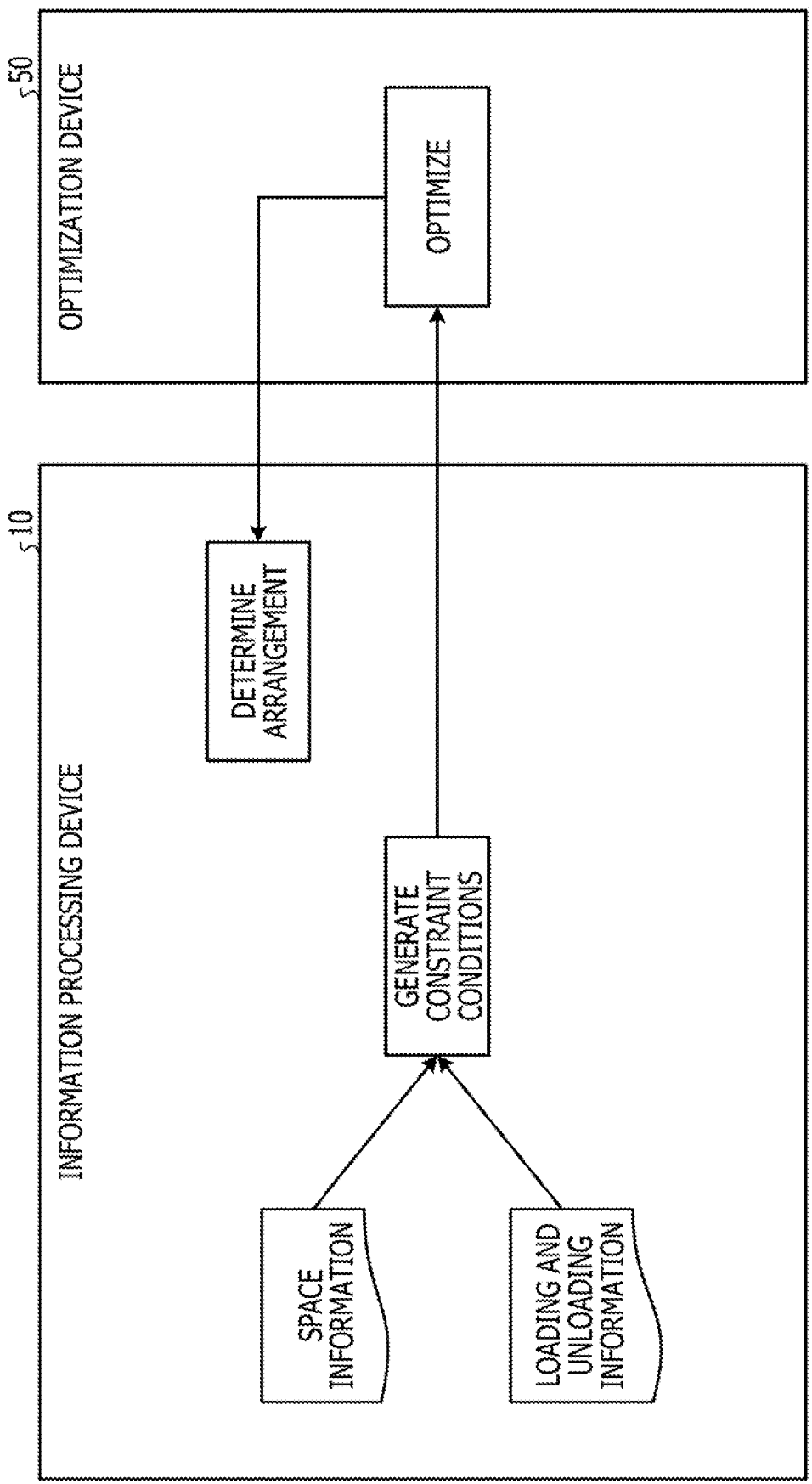

FIG. 6

|  | LOADING PORT | | |
|---|---|---|---|
| UNLOADING PORT | A | B | C |
| D | (1) 800 | (2) 400 | (3) 1300 |
| E | (4) 600 | (5) 100 | (6) 500 |
| F | (7) 1100 | (8) 1600 | (9) 200 |

FIG. 11
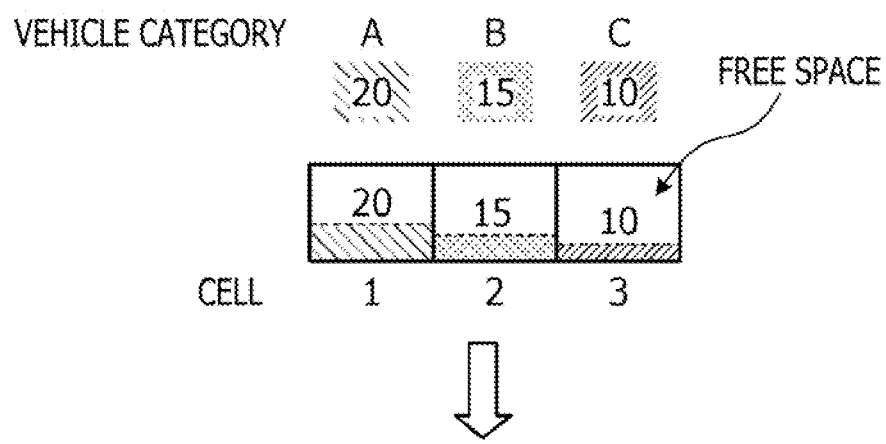
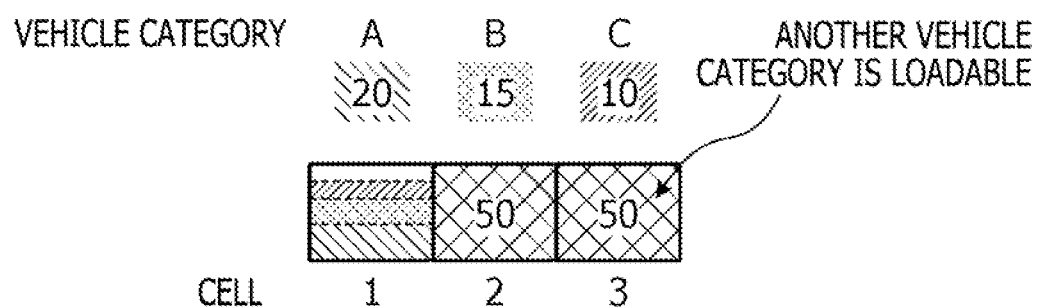

INFORMATION PROCESSING DEVICE, OPTIMIZATION METHOD, AND NON-TRANSITORY COMPUTER-READABLE STORAGE MEDIUM FOR STORING OPTIMIZATION PROGRAM

CROSS-REFERENCE TO RELATED APPLICATION

This application is based upon and claims the benefit of priority of the prior Japanese Patent Application No. 2020-137654, filed on Aug. 17, 2020, the entire contents of which are incorporated herein by reference.

FIELD

The embodiments discussed herein are related to an information processing device, an optimization method, and a non-transitory computer-readable storage medium storing an optimization program.

BACKGROUND

When a cargo is placed in a multi-story warehouse, a flat parking space, a vehicle transport ship, etc., arrangement of cargoes or the like at the time of loading them is optimized in order that the cargoes or the like do not block passage when the cargoes or vehicles are loaded and unloaded.

For example, a technique has been known for optimizing a balance or the like of a single-story ship with an open ceiling, when thin plate coils are transported from a plurality of warehouses to the ship and stacked in two levels on the ship. In addition, a technique has been known for creating, in a case where deliveries are delivered from a plurality of delivery sources to a plurality of delivery destinations, a delivery plan that provides excellent transport efficiency in order that, after the deliveries are unloaded at each delivery destination, another delivery is loaded and delivered to the next delivery destination. Furthermore, a technique has been known for individually determining, in a loading plan (vehicle arrangement) for a car carder, vehicle arrangement so as not to form a broken space while avoiding an obstacle in the carrier within a block in the carrier.

Examples of the related art include Japanese Laid-open Patent Publication No. 10-305929, Japanese Laid-open Patent Publication No. 2005-112609, and Japanese Laid-open Patent Publication No. 1-127526.

However, in the above-mentioned techniques, in a case where the cargoes or the like are loaded and unloaded a plurality of times, there are many constraint conditions, so that it takes much time for optimization. For example, consider a vehicle transport ship into which vehicles are loaded at multiple ports and from which the vehicles are unloaded at multiple ports. In this case, a planning for arranging vehicles in each block within the vehicle transport ship needs to be created in consideration of that it is possible to perform loading and unloading. Such planning is commonly created manually and takes a great deal of time.

According to an aspect of the embodiments disclosed below, there is provided a solution to reduce a time taken to optimize arrangement of cargoes.

SUMMARY

According to an aspect of the embodiments, there is provided an optimization method in which a computer performs processing. In an example, the processing includes: receiving space information regarding a plurality of sections, a route between the plurality of sections, and a route from each of the plurality of sections to an entrance for a target space that includes the entrance and is divided into the plurality of sections; setting a coefficient used to change a maximum load capacity of a cargo to be arranged in each of a plurality of regions for each of the plurality of regions included in each of the plurality of sections; generating a first constraint condition that indicates that another cargo does not exist on the route from a cargo to be loaded or to be unloaded to the entrance at the time when the cargo is loaded and unloaded on the basis of the space information, a second constraint condition that indicates the number of cargoes to be loaded and the number of cargoes to be unloaded calculated using the coefficient, and a third constraint condition that indicates the maximum load capacity of each of the plurality of regions calculated using the coefficient; and determining cargo arrangement in the target space on the basis of the first constraint condition, the second constraint condition, and the third constraint condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram for explaining an information processing device according to a first embodiment;

FIG. 6 is a diagram for explaining a vehicle loading and unloading table;

FIG. 11 is a diagram for explaining effects; and

DESCRIPTION OF EMBODIMENTS

Figure 2A:
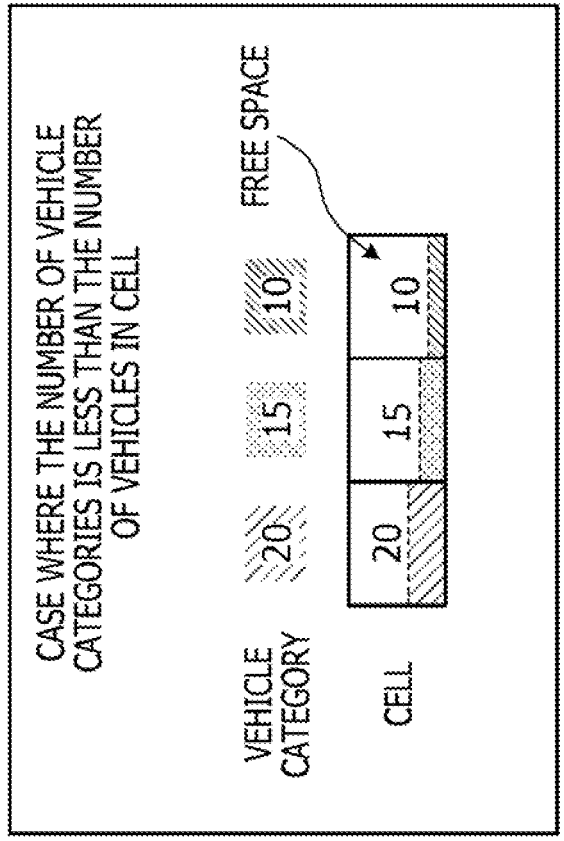
FIGS. 2A and 2B are diagrams for explaining a problem.

Hereinafter, embodiments of an information processing device, an optimization method, and an optimization program disclosed in the present application will be described in detail with reference to the drawings. Note that the present disclosure is not limited to the embodiments. Furthermore, each of the embodiments may be appropriately combined within a range without inconsistency.

First Embodiment

[Description of Information Processing Device]

FIG. 1 is a diagram for describing an information processing device 10 according to a first embodiment. The information processing device 10 illustrated in FIG. 1 is one example of a computer device that, when a cargo is placed in a multi-story warehouse, a flat parking space, a vehicle transport ship, etc., optimizes arrangement of cargoes upon loading them or the like in order that the cargoes or the like do not block passage during loading and unloading of cargoes or vehicles.

In the first embodiment, an example of the arrangement of the cargoes will be described, taking, as an example, a vehicle transport ship into which vehicles are loaded at several parts and from which vehicles are unloaded at several ports in one voyage. Note that the vehicle is an example of a cargo, and the vehicle transport ship is an example of a target space in which the cargo is placed.

As illustrated in FIG. 1, the information processing device 10 receives an input of space information regarding an inside of the vehicle transport ship which is divided into a plurality of sections and in which vehicles are placed and a route between the plurality of sections and a route from each of the plurality of sections to an entrance are defined. Similarly, the information processing device 10 receives an input of loading and unloading information corresponding to a so-called vehicle loading and unloading table which indicates ports where vehicles are loaded, ports where vehicles are unloaded, and how many vehicles are loaded or unloaded at each port.

Then, the information processing device 10 generates a constraint condition using the input information. For example, the information processing device 10 generates a first constraint condition indicating that there is no other vehicle on the route from a vehicle to be loaded or unloaded to the entrance at the time of loading and unloading vehicles. In addition, the information processing device 10 generates a second constraint condition indicating that the number of vehicles to be loaded and the number of vehicles to be unloaded are values specified in the loading and unloading information. Furthermore, the information processing device 10 generates a third constraint condition indicating that vehicles are placed within each of a plurality of sections with a load capacity not exceeding a preset load capacity (maximum load capacity). Thereafter, the information processing device 10 determines optimum vehicle arrangement under the first constraint condition, the second constraint condition, and the third constraint condition, using an optimization device 50 such as an annealing computer or an Ising machine.

However, under these three constraint conditions, there is a case where a space in which the vehicles are placed cannot be effectively used. For example, the space in the vehicle transport ship is divided into sections referred to as blocks, and each block is divided into cell units indicating an arrangement target region. Then, it is considered that the information processing device 10 optimizes the number of vehicles arranged in each cell using the three constraint conditions described above. However, since optimization totally using all the cells is executed at this time, a cell that cannot be effectively used may occur.

Figure 2B:
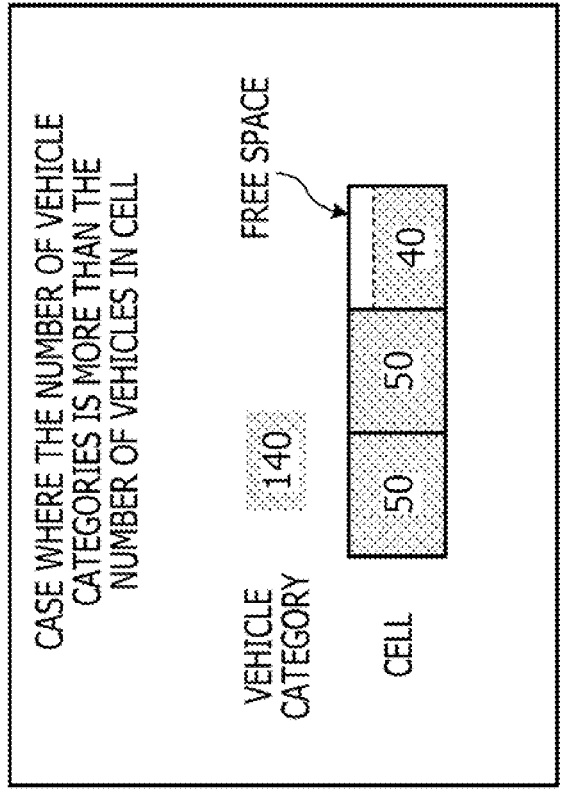

FIGS. 2A and 2B are diagrams for explaining a problem. Note that a vehicle category used in the present embodiment indicates a vehicle to be arranged and is determined according to a combination of a port where the vehicle is loaded and a port where the vehicle is unloaded. For example, in a case of a vehicle loading and unloading table 15 in FIG. 6 to be described later, nine vehicle categories exist.

FIGS. 2A and 2B illustrate an example in which vehicles to be arranged (vehicle categories) are distributed into three cells and are arranged. FIG. 2A illustrates an example in which the number of vehicles to be arranged is 140 and it is determined that 50 vehicles, 50 vehicles, and 40 vehicles are arranged in the respective cells. In this case, since a free space is small, the cells can be effectively used. On the other hand, FIG. 2B illustrates an example in which the number of vehicles to be arranged is 45 and it is determined that 20 vehicles, 15 vehicles, and 10 vehicles are arranged in the respective cells. In this case, since the vehicles are arranged in all the cells, the free space is large, and it is not possible to effectively use the cells.

That is, for example, in a case where the number of vehicle categories (i.e., the number of vehicles to be arranged) listed in the vehicle loading and unloading table is larger than the number of vehicles in the cell, the number of vehicle categories is not necessarily a multiple of the number of vehicles in the cell. Therefore, a free space where vehicles are not arranged is provided. However, the value is less than the number of vehicle categories. However, in a case where the number of vehicle categories is less than the number of vehicles in the cell, when a small number of vehicle categories occupy one cell, it is not possible for the other vehicle categories to occupy the cell. Therefore, a free space larger than the number of vehicle categories is provided. As a result, it is not possible to load all the vehicles in the vehicle loading and unloading table on the ship. Furthermore, there is a problem in that, when the size of the cell is reduced due to the constraints of the optimization device 50, the number of needed bits increases, and a calculation amount increases.

Therefore, in the first embodiment, for the second constraint condition and the third constraint condition, a coefficient used to change the maximum load capacity of the vehicles to be arranged in each cell is set for each cell where the vehicle is arranged in each of the plurality of sections. In this way, the information processing device 10 can provide a vehicle arrangement method that does not provide a large free space even in a case where it is needed to arrange the number of vehicles less than the number of cells while shortening a time taken to optimize cargo arrangement.

[Functional Configuration of Information Processing Device]

Figure 3:
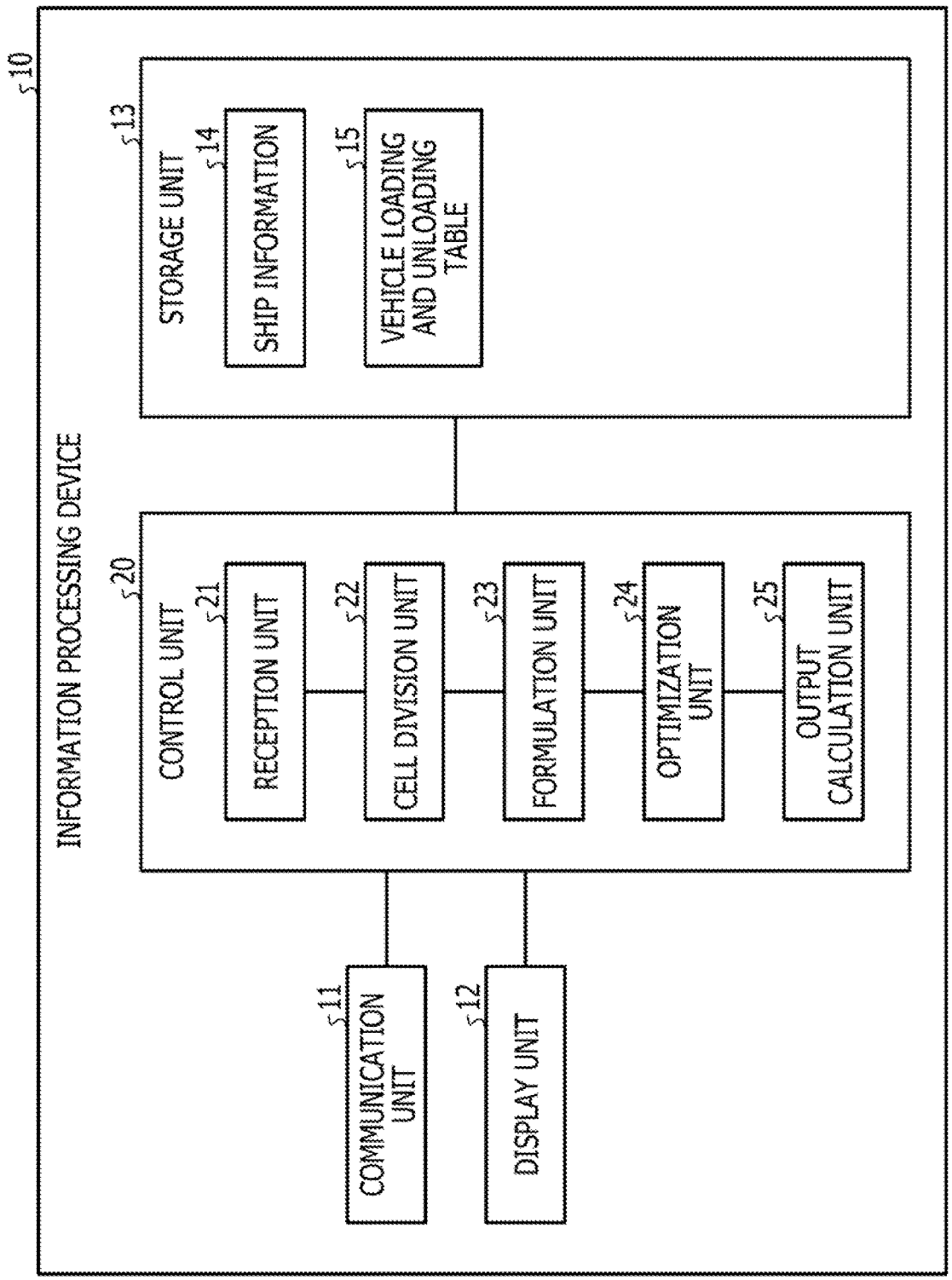
FIG. 3 is a functional block diagram illustrating a functional configuration of the information processing device according to the first embodiment.

FIG. 3 is a functional block diagram illustrating a functional configuration of the information processing device 10 according to the first embodiment. As illustrated in FIG. 3, the information processing device 10 includes a communication unit 11, a display unit 12, a storage unit 13, and a control unit 20.

The communication unit 11 is a processing unit that controls communication with another device, and is achieved by, for example, a communication interface or the like. For example, the communication unit 11 transmits and receives various kinds of data to and from an external device such as a device used by an administrator or the like.

The display unit 12 is a processing unit that displays various types of information, and is achieved by, for example, a display, a touch panel, or the like. For example, the display unit 12 displays a finally obtained result of vehicle arrangement, a calculated solution result, and the like.

The storage unit 13 is a processing unit that stores various kinds of data, programs executed by the control unit 20, and the like, and is achieved by, for example, a memory, a hard disk, or the like. The storage unit 13 stores ship information 14 and the vehicle loading and unloading table 15.

The ship information 14 is an example of the space information regarding the vehicle transport ship which is divided into a plurality of sections and in which vehicles are placed and a route between the plurality of sections and a route from each of the plurality of sections to an entrance are defined. For example, the ship information 14 corresponds to information obtained by graphically illustrating a schematic diagram of the vehicle transport ship or the like.

Figure 4:
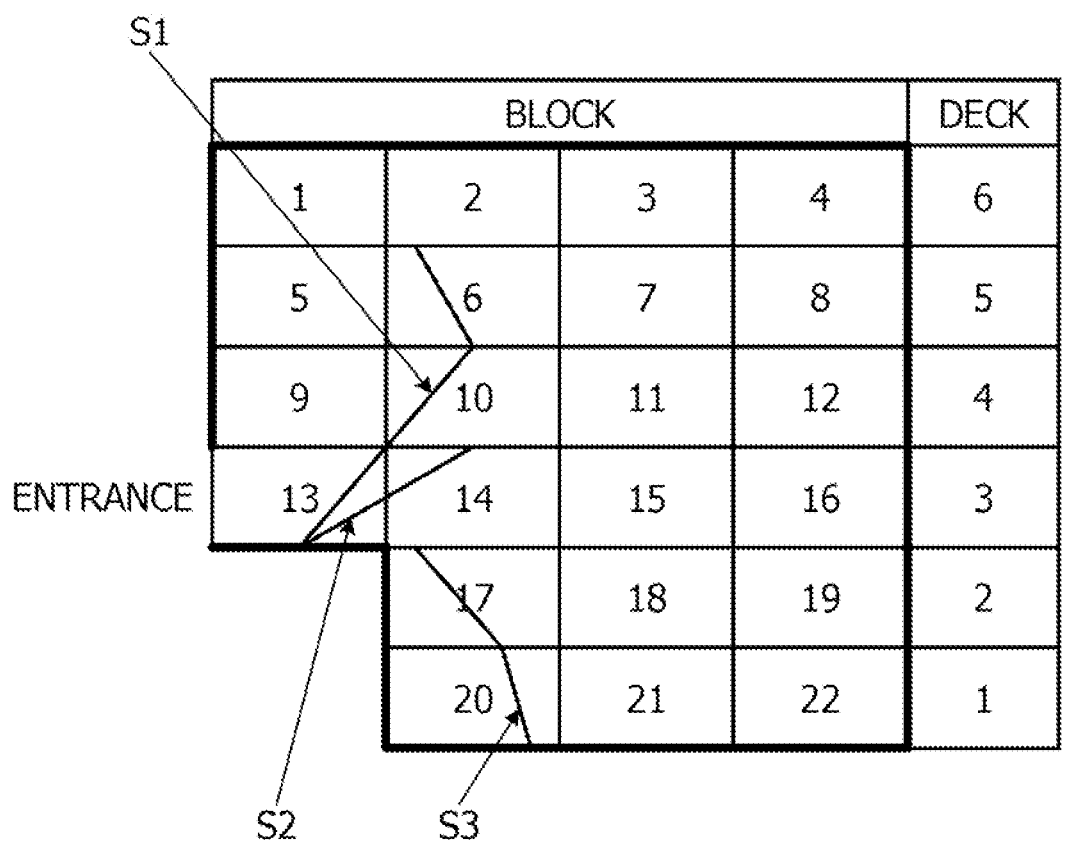
FIG. 4 is a schematic diagram of a vehicle transport ship.

First, the schematic diagram of the vehicle transport ship will be described. FIG. 4 is a schematic diagram of the vehicle transport ship. As illustrated in the schematic diagram of FIG. 4, the vehicle transport ship has six floors from a deck 1 on the first floor to a deck 6 on the sixth floor. Each deck is divided into blocks. The vehicle transport ship has one entrance on the deck 3. The decks are connected by slopes S1, S2, and S3.

Furthermore, the deck 6 is divided into four blocks including blocks 1 to 4, the deck 5 is divided into four blocks including blocks 5 to 8, and the deck 4 is divided into four blocks including blocks 9 to 12. Similarly, the deck 3 is divided into four blocks including blocks 13 to 16, the deck 2 is divided into three blocks including blocks 17 to 19, and the deck 1 is divided into three blocks including blocks 20 to 22.

In addition, the slope S1 is a route from the deck 6 and the deck 5 to the entrance on the deck 3, the slope S2 is a route from the deck 4 to the entrance, and the slope 53 is a route from the deck 2 and the deck 1 to the entrance.

Figure 5:
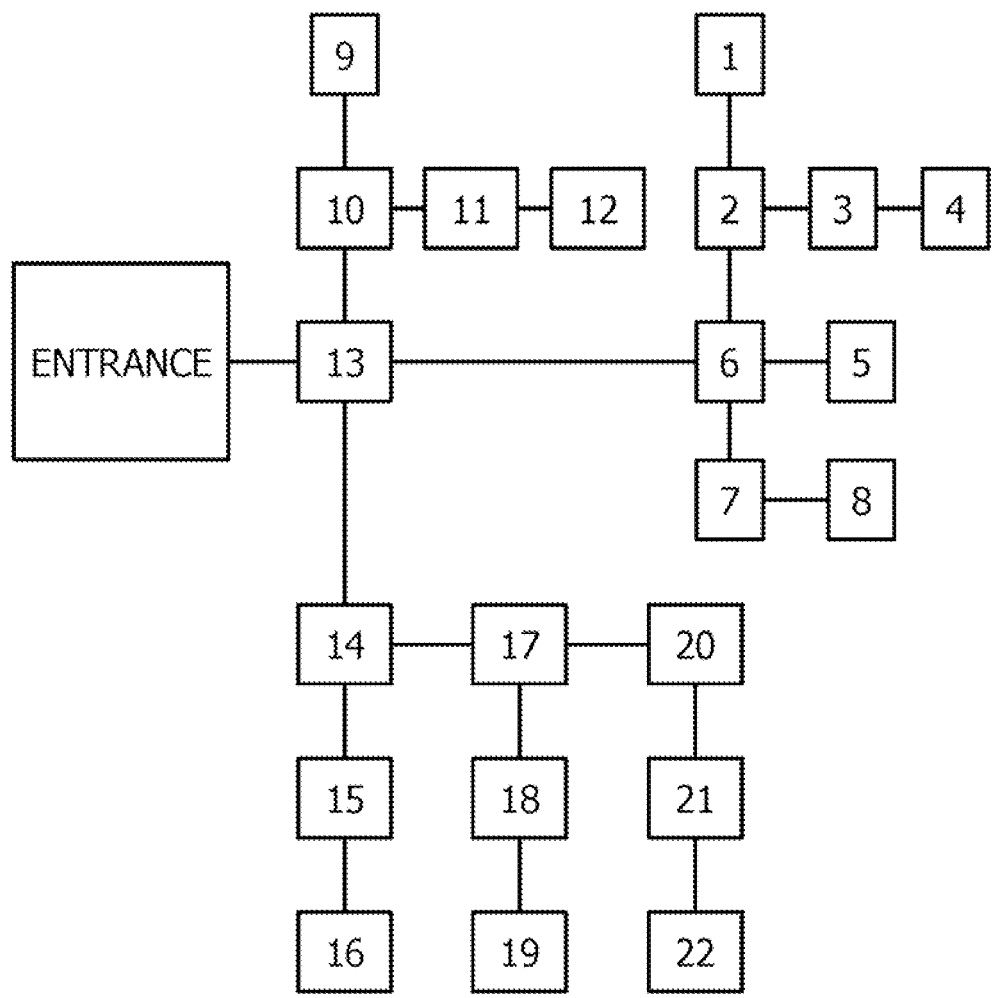
FIG. 5 is a diagram graphically illustrating a space in the vehicle transport ship.

Next, the information obtained by graphically illustrating the schematic diagram of the vehicle transport ship will be described. FIG. 5 is a diagram graphically illustrating a space in the vehicle transport ship. As illustrated in FIG. 5, the blocks in the same deck are connected to each other. In addition, the blocks 1 to 4 of the deck 6 are connected to the entrance sequentially via the block 2, the block 6, and, the block 13. The blocks 5 to 8 of the deck 5 are connected to the entrance sequentially via the block 6 and the block 13. The blocks 9 to 12 of the deck 4 are connected to the entrance sequentially via the block 10 and the block 13.

The blocks 13 to 16 of the deck 3 are connected to the entrance via the block 13. The blocks 17 to 19 of the deck 2 are connected to the entrance sequentially via the block 17, the block 14, and the block 13. The blocks 20 to 22 of the deck 1 are connected to the entrance sequentially via the block 20, the block 17, the block 14, and the block 13.

Note that the ship information 14 includes load information that specifies, for example, the maximum load capacity of each block as well as the information regarding the graphical structure including the deck positions, the block positions, the slope positions, and the like illustrated in FIG. 5.

Returning to FIG. 3, the vehicle loading and unloading table 15 is an example of loading and unloading information that defines the order of ports the vehicle transport ship calls at, the number of vehicles to be unloaded, and the like. FIG. 6 is a diagram for explaining the vehicle loading and unloading table 15. As illustrated in FIG. 6, in the vehicle loading and unloading table 15, a loading port where vehicles are loaded, an unloading port where vehicles are unloaded, and the numbers of vehicles to be loaded and unloaded are associated with each other.

Specifically, for example, the vehicle loading and unloading table 15 specifies that the vehicle transport ship stops in the order of a port A→a port B→a port C→a port D→a port E→a port F. In addition, each number in the vehicle loading and unloading table 15 indicates the number of vehicles to be loaded and unloaded at each port. For example, 1600 vehicles (8) are loaded at the port B and unloaded at the port F.

The control unit 20 is a processing unit that controls the entire information processing device 10 and is achieved by, for example, a processor or the like. The control unit 20 includes a reception unit 21, a cell division unit 22, a formulation unit 23, an optimization unit 24, and an output calculation unit 25. Note that the reception unit 21, the cell division unit 22, the formulation unit 23, the optimization unit 24, and the output calculation unit 25 may be achieved by electronic circuits such as a processor, or may be achieved as an example of a process executed by the processor.

The reception unit 21 is a processing unit that receives the ship information 14 and the vehicle loading and unloading table 15. For example, the reception unit 21 receives the ship information 14 and the vehicle loading and unloading table 15 from an administrator terminal or the like via the communication unit 11 and stores them in the storage unit 13. Note that the ship information 14 and the vehicle loading and unloading table 15 may be information artificially generated by the administrator or the like, or information generated using a known tool or the like.

The cell division unit 22 is a processing unit that divides each block into cells on the basis of the ship information 14 and the vehicle loading and unloading table 15. Specifically, for example, the cell division unit 22 divides each block into cells using the number of blocks and the number of vehicle categories of which the number is more than zero. The number of divided cells is preferably determined according to specifications of the optimization device 50. For example, if the number of divided cells is too large, the number of variables increases, and the optimization speed with the optimization device 50 decreases. Therefore, it is preferable to make determination according to a processing capacity of the optimization device 50.

Figure 7:
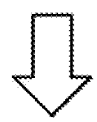
FIG. 7 is a diagram for explaining division of a block into cells.

For example, specific description will be made with reference to FIG. 7. FIG. 7 is a diagram for explaining division of a block into cells. In the example in FIG. 7, an example is illustrated in which the number of loading ports is three, the number of unloading ports is three, the number of blocks is three, the numbers of vehicles that the respective blocks can load are "the block 1=73, the block 2=106, and the block 3=63", and the number of bits that can be used by the optimization device 50 is 64, Here, it is assumed that the number of vehicles that can be loaded in the divided cell be z. In consideration of the number of possible $x_{ijlk}$, Equation (1) is satisfied. Note that nine vehicle categories can be arranged for one cell on the basis of the vehicle loading and unloading table 15. Furthermore, details of "$x_{ijkm}$" will be described later.

$$3\times3\times(73/z+106/z+63/z)\geq64 \quad (1)$$

Then, the cell division unit 22 calculates "$z\geq34.0$" by solving this equation. Therefore, the number of cells in the block 1 is 2.1, the number of cells in the block 2 is 3.1, and the number of cells in the block 3 is 1.9. When the numbers are rounded and converted into integers, the number of cells in the block 1 is two, the number of cells in the block 2 is three, and the number of cells in the block 3 is two. Therefore, as illustrated in FIG. 7, the block 1 is divided into two cells, the block 2 is divided into three cells, and the block 3 is divided into two cells. Therefore, each block has a cell with a size of 31 to 37 vehicles. The number of bits that are actually used is "3×3×(2+3+2)=63" bits. Note that, since the number of cells is converted into an integer, in a case where the number of used bits exceeds 64 bits, the cell division unit 22 increases the value of z to be larger than 34.0 and converts the number of used bits into a value equal to or less than 64.

The formulation unit 23 is a processing unit that formulates the constraint conditions using the ship information 14, the vehicle loading and unloading table 15, the cell division result, or the like. Specifically, for example, the formulation unit 23 regards an optimization problem according to the first embodiment as a mathematical optimization problem, and generates a plurality of constraint conditions.

(Premise)

Figure 8:
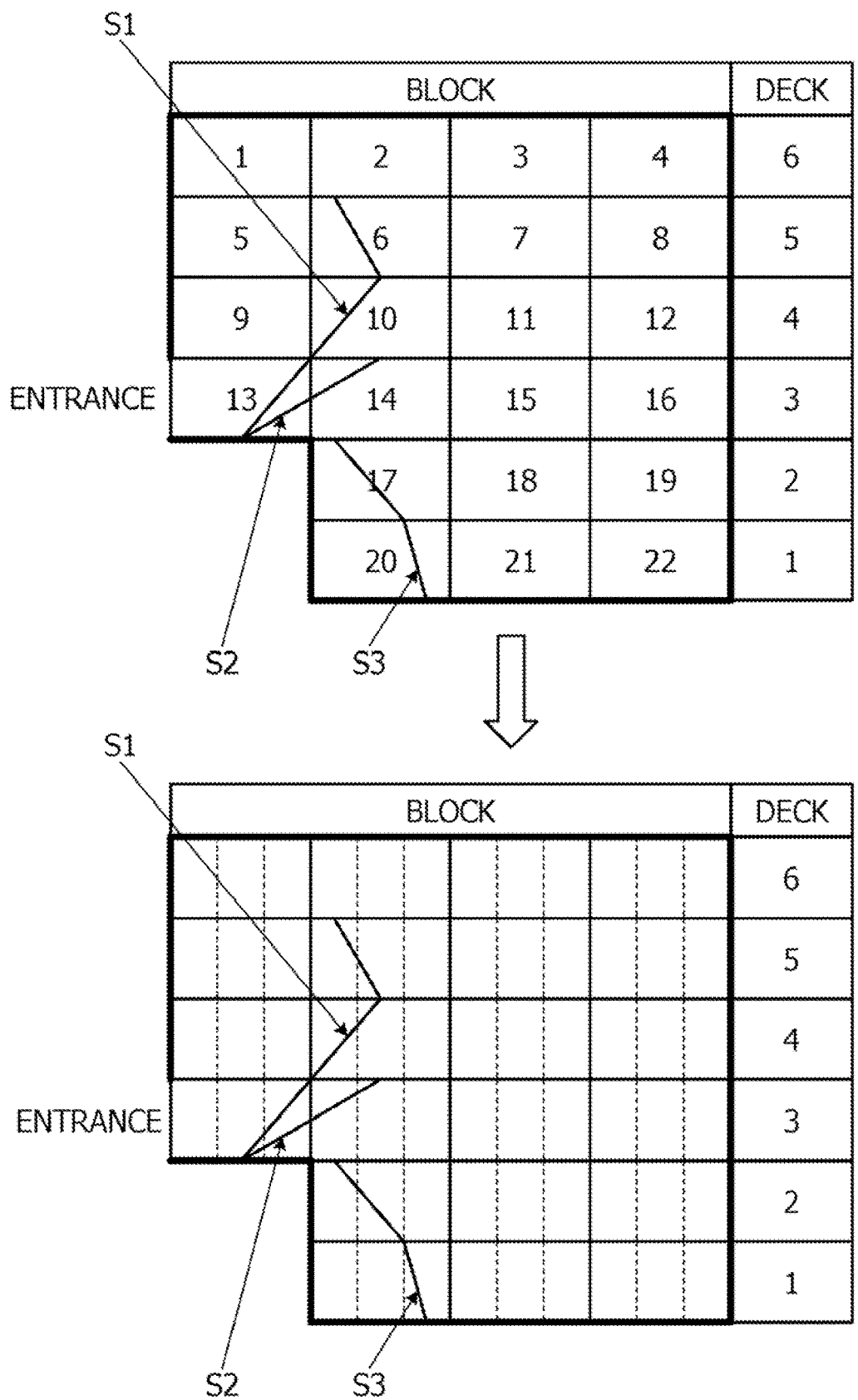
FIG. 8 is a schematic diagram of blocks divided into cells.

Here, the formulation unit 23 divides each block into cells and assigns binary variables to the respective cells. FIG. 8 is a schematic diagram of the blocks divided into cells. In FIG. 8, each block is divided into three cells. Note that, although FIG. 8 illustrates an example in which each block is divided into the same number of cells, the number is not limited to this, and the number of cells of the respective blocks may be different from each other.

Then, the formulation unit 23 determines definitions of variables and constants as follows. "$x_{ijkm}$" is a value of "1" or "0". Note that, when "$x_{ijkm}$" is "1", it indicates that vehicles to be loaded at a loading port i and to be unloaded at an unloading port j exist in a cell m in a block k, and "$x_{ijkm}$," is "0" in other cases. "$C_{ij}$" is the number of vehicles to be loaded at the loading port i and to be unloaded at the unloading port j. "$b_{km}$" is the maximum load capacity of the cell m in the block k. "M" is the number of loading ports, "N" is the number of unloading ports, "R" is the number of blocks, and "$S_k$" is the number of cells in the block k.

(Constraint Condition 1)

Next, a constraint condition 1 will be described. For example, the formulation unit 23 generates the constraint condition 1 indicating that there is no other cargo on the route from the cargo to be loaded or unloaded to the entrance at the time when the cargo is loaded or unloaded. In other words, for example, the formulation unit 23 generates the constraint condition 1 indicating that "when a vehicle passes through a certain block, the vehicle is unable to pass unless there are no vehicles in the block".

For example, when there is a vehicle in a cell and a block between the cell and the entrance is focused, it is sufficient that a vehicle loaded at the loading port preceding the loading port at which the vehicle is loaded does not exist in the block, and a vehicle to be unloaded at the unloading port after the unloading port at which the vehicle is unloaded does not exist in the block. Therefore, when there is a vehicle loaded at a loading port p and to be unloaded at an unloading port q in a cell s of a block r, the formulation unit 23 may define a vehicle $y_{pq}$ that blocks the passage by Equation (2) as assuming that k' indicates a block between the cell s and the entrance.

$$y_{pq} = \sum_{i=1}^{p-1}\sum_{j=1}^{N}\sum_{k'}\sum_{m=1}^{S_{k'}} x_{ijkm} + \sum_{i=1}^{M}\sum_{j=q+1}^{N}\sum_{k'}\sum_{m=1}^{S_{k'}} x_{ijkm} \qquad (2)$$

Here, it is desirable that, for a certain $x_{pqrs}$, ($y_{pq}=0$ when $x_{pqrs}=1$) and ($y_{pq}$ is an arbitrary value when $x_{pqrs}=0$), and this may be defined by Equation (3). In that case, ($x_{pqrs} \cdot y_{pq}$) is the minimum. Therefore, it is desirable that. Equation (4) that calculates the sum of all of p, q, r, and s be satisfied. In this way, the formulation unit 23 generates Equation (4) as a constraint condition 1(B).

$$x_{pqrs} \cdot y_{pq} = 0 \qquad (3)$$

$$B = \sum_{p=1}^{M}\sum_{q=1}^{N}\sum_{r=1}^{R}\sum_{s=1}^{S_r}(x_{pqrs} \cdot y_{pq}) = 0 \qquad (4)$$

(Constraint Condition 2)

Next, a constraint condition 2 will be described. For example, the formulation unit 23 generates the constraint condition 2 indicating that the number of cargoes to be loaded and the number of cargoes to be unloaded are values specified in the loading and unloading information. In other words, for example, the formulation unit 23 generates the constraint condition 2 indicating that "the number of vehicles to be loaded at the loading port and the number of vehicles to be unloaded at the unloading port are the values specified in the vehicle loading and unloading table 15."

For example, it is sufficient that the total sum of the number of vehicles loaded at the loading port p and the number of vehicles unloaded at the unloading port q in the entire vehicle transport ship be equal to a value $c_{pq}$ in the vehicle loading and unloading table 15, and this is defined by Equation (5). Therefore, it is sufficient that Equation (6) that calculates the sum of all of p and q be satisfied.

$$\sum_{k=1}^{R}\sum_{m=1}^{S_k} b_{km}x_{pqkm} = c_{pq} \qquad (5)$$

$$C = \sum_{p=1}^{M}\sum_{q=1}^{N}\left(\sum_{k=1}^{R}\sum_{m=1}^{S_k} b_{km}x_{pqkm} - c_{pq}\right)^2 = 0 \qquad (6)$$

Here, in order to improve the problems described above, the formulation unit 23 sets a weighting coefficient for changing the maximum load capacity of the cargo to be arranged in each cell for each cell, Specifically, for example, for each cell, the formulation unit 23 calculates a weighting coefficient on the basis of the number of vehicles to be arranged in the cell and the number of vehicles arranged in the cell based on the ship information 14.

For example, the formulation unit 23 compares the number of cells and the number of vehicle categories and defines "(the number of vehicle categories)/(the number of cells)" as a weighting coefficient "$w_{ijkm}$" when the number of vehicle categories is less than the number of cells, and solves the optimization problem using a product with a variable "$x_{ijkm}$". Note that the number of vehicle categories here corresponds to 800 vehicles (1) illustrated in FIG. 6 or the like.

Specifically, for example, regarding a cell m in a certain block k, the formulation unit 23 sets "$w_{ijkm}=c_{ij}/b_{km}$" when "$c_{ij}<b_{km}$" and sets "$w_{ijkm}=1$" when "$c_{ij} \geq b_{km}$" using "$w_{ijkm}$" as the weighting coefficient as indicated in Equation (7). Then, the formulation unit 23 generates Equation (8) indicating the vehicle represented by the variable "$x_{ijkm}$" in Equation (6) as "weighting coefficient×variable=$w_{ijkm} \times x_{ijkm}$" as a constraint condition 2 "C". Note that, since the sizes "$b_{km}$" of the cells are not uniform, the formulation unit 23 calculates the weighting coefficient "$w_{ijkm}$" for all the cells.

When $c_{ij} < b_{km}$, $w_{ijkm} = c_{ij}/b_{km}$ (7)

When $c_{ij} \geq b_{km}$, $w_{ijkm} = 1$ $$C' = \sum_{p=1}^{M}\sum_{q=1}^{N}\left(\sum_{k=1}^{R}\sum_{m=1}^{S_k} b_{km}x_{pqkm}\, x_{pqkm} - c_{pq}\right)^2 \quad (8)$$

(Constraint Condition 3)

Next, a constraint condition 3 will be described. For example, the formulation unit 23 generates the constraint condition 3 indicating that the cargo is arranged in each of the plurality of sections with a load capacity not exceeding a preset load capacity. In other words, for example, the formulation unit 23 generates the constraint condition 3 indicating that "it is not possible to load vehicles equal to or greater than the maximum load capacity in one cell".

For example, although the vehicles in one vehicle category exist in the cell, vehicles in two vehicle categories do not exist in the same cell. That is, for example, for a certain cell s in a certain block r, it is sufficient that the total sum of all ports is zero or one, which is defined by Equation (9). A certain $x_{pqrs}$ may be defined by Equation (10). Therefore, it is sufficient that Equation (11) that calculates summation for all of r and s be satisfied.

$$\sum_{i=1}^{M}\sum_{j=1}^{N} x_{ijrs} = 0 \text{ or } 1 \quad (9)$$

$$\left(\sum_{i=1}^{M}\sum_{j=1}^{N} x_{ijrs}\right)\left(\sum_{i=1}^{M}\sum_{j=1}^{N} x_{ijrs} - 1\right) = 0 \quad (10)$$

$$D = \sum_{r=1}^{R}\sum_{s=1}^{S_r}\left\{\left(\sum_{i=1}^{M}\sum_{j=1}^{N} x_{ijrs}\right)\left(\sum_{i=1}^{M}\sum_{j=1}^{N} x_{ijrs} - 1\right)\right\} \quad (11)$$

Here, in order to improve the problems described above, the formulation unit 23 introduces the weighting coefficient "$w_{ijkm}$" calculated using Equation (7) into Equation (11). In other words, for example, the formulation unit 23 generates Equation (12) indicating the vehicle represented by the variable "$x_{ijkm}$" in Equation (11) as "weighting coefficient× variable $w_{ijkm} \times$ '$x_{ijkm}$'" as a constraint condition 3 "D'".

$$D' = \sum_{r=1}^{R}\sum_{s=1}^{S_r}\left\{\left(\sum_{i=1}^{M}\sum_{j=1}^{N} w_{ijrs}x_{ijrs}\right)\left(\sum_{i=1}^{M}\sum_{j=1}^{N} w_{ijrs}x_{ijrs} - 1\right)\right\} \quad (12)$$

As described above, the formulation unit 23 generates the constraint condition 1, the constraint condition 2, and the constraint condition 3, and outputs the generated constraint conditions to the optimization unit 24.

The optimization unit 24 is a processing unit that determines optimum vehicle arrangement in the vehicle transport ship on the basis of the conditions including the constraint condition 1, the constraint condition 2, and the constraint condition 3. Specifically, for example, the optimization unit 24 defines an energy function that is the sum of Equations (4), (8), and (12) as Equation (13) and solves the problem by an optimization device 50 using this Equation (13). In other words, for example, the optimization unit 24 inputs an energy function E into the optimization device 50 such as an Ising machine or an annealing computer, and operates the optimization device 50 so as to calculate the optimum vehicle arrangement.

$$E = \quad (13)$$
$$\beta\sum_{p=1}^{M}\sum_{q=1}^{N}\sum_{r=1}^{R}\sum_{s=1}^{S_k}\left\{x_{pqrs}\left(\sum_{i=1}^{p-1}\sum_{j=1}^{N}\sum_{k'}\sum_{m=1}^{S_{k'}} x_{ijkm} + \sum_{i=1}^{M}\sum_{j=q+1}^{N}\sum_{k'}\sum_{m=1}^{S_{k'}} x_{ijkm}\right)\right\} \cdots$$
Constraint condition 1

$$+\gamma\sum_{p=1}^{M}\sum_{q=1}^{N}\left(\sum_{k=1}^{R}\sum_{m=1}^{S_k} b_{km}w_{pqkm}x_{pqkm} - c_{pq}\right)^2 \cdots \text{Constraint condition 2}$$

$$+\delta\sum_{r=1}^{N}\sum_{s=1}^{S_k}\left(\left(\sum_{i=1}^{M}\sum_{j=1}^{N} w_{ijrs}x_{ijrs}\right)\left(\sum_{i=1}^{M}\sum_{j=1}^{N} w_{ijrs}x_{ijrs} - 1\right)\right)$$
$\cdots$ Constraint condition 3

($\beta$, $\gamma$, and $\delta$ are constants)

The output calculation unit 25 is a processing unit that calculates the optimum vehicle arrangement. Specifically, for example, the output calculation unit 25 determines the optimum vehicle arrangement using the solution result by the optimization device 50 acquired by the optimization unit 24. Then, the output calculation unit 25 displays the determined vehicle arrangement on the display unit 12 or stores the determined vehicle arrangement in the storage unit 13.

Figure 9:
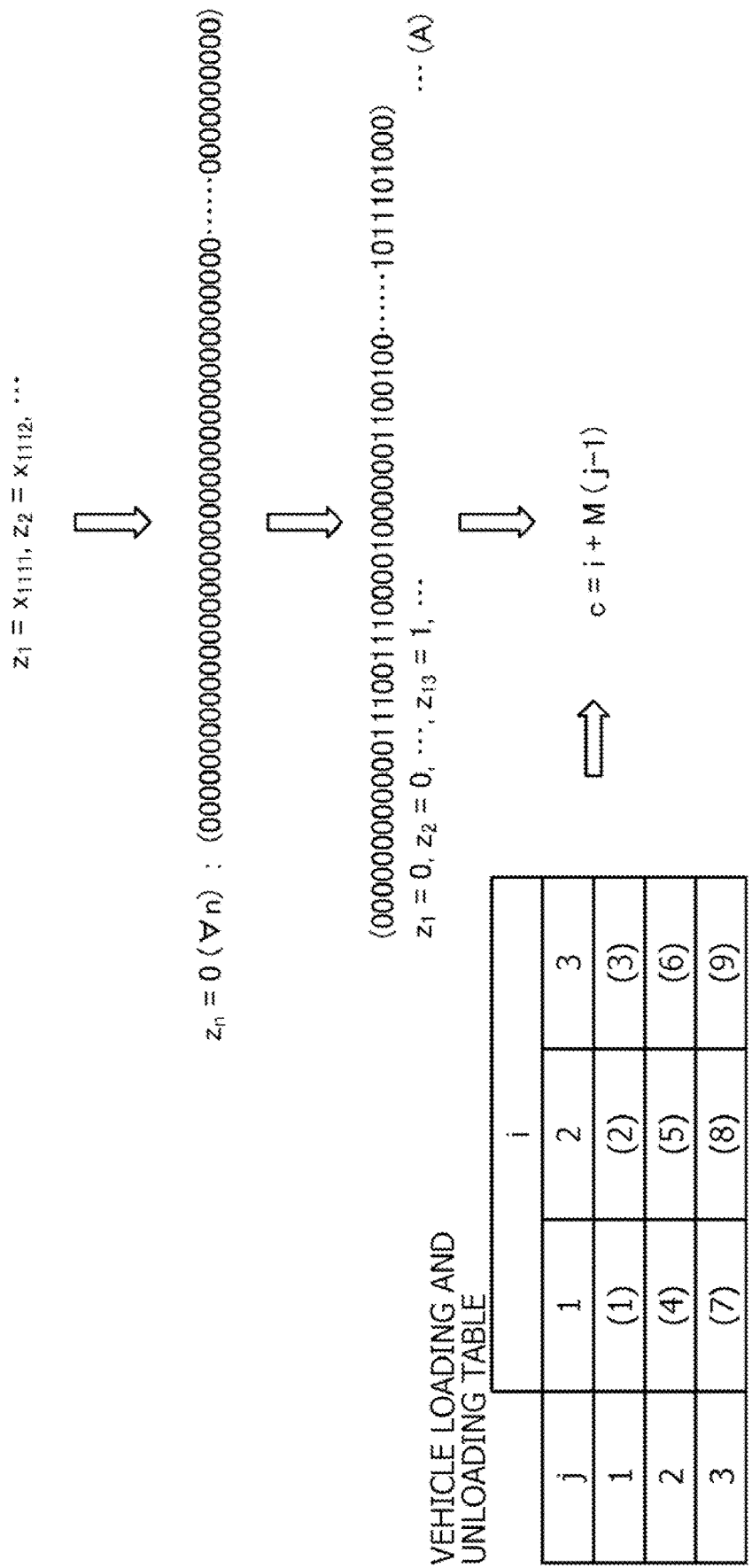
FIG. 9 is a diagram for describing solving by an optimization device and calculation of vehicle arrangement represented by a solution.

FIG. 9 is a diagram for describing solving by an optimization device and calculation of vehicle arrangement represented by a solution. As illustrated in FIG. 9, the output calculation unit 25 defines a binary variable $z_n$, and associates $z_n$ with $w_{ijkm}$, for example, $z_1=x_{1111}$ and $z_2=x_{1112}$. For example, when the optimization device performs calculation using $z_n=0$, (000 . . . 000) as an initial solution, the solution ($z_1=1$, $z_2=0$ . . . , $z_{13}=1$ . . . ) represented by Equation (A) in FIG. 9 is obtained.

Here, there is a vehicle when $z_n=1$. Therefore, the output calculation unit 25 extracts n that provides $z_n=1$, and obtains corresponding i, j, k, and m. In this way, the output calculation unit 25 may calculate the loading port i, the unloading part j, and the cell m in the block k where the vehicle exists. For example, if the number written in an intersection in the vehicle loading and unloading table 15 where the loading port is defined as i and the unloading port is defined as j is defined as c, and the number of vehicles to be loaded is M, the output calculation unit 25 may represent c as "c=i+M (j−1)". Therefore, the output calculation unit 25 may indicate that the vehicle c exists in the cell m in the block k.

By executing the above-mentioned processing, the output calculation unit 25 calculates the loading port i, the unloading port j, and the cell m in the block k where the vehicle exists, and associates the calculated results with the schematic diagram, thereby determining the vehicle arrangement.

[Flow of Processing]

Figure 10:
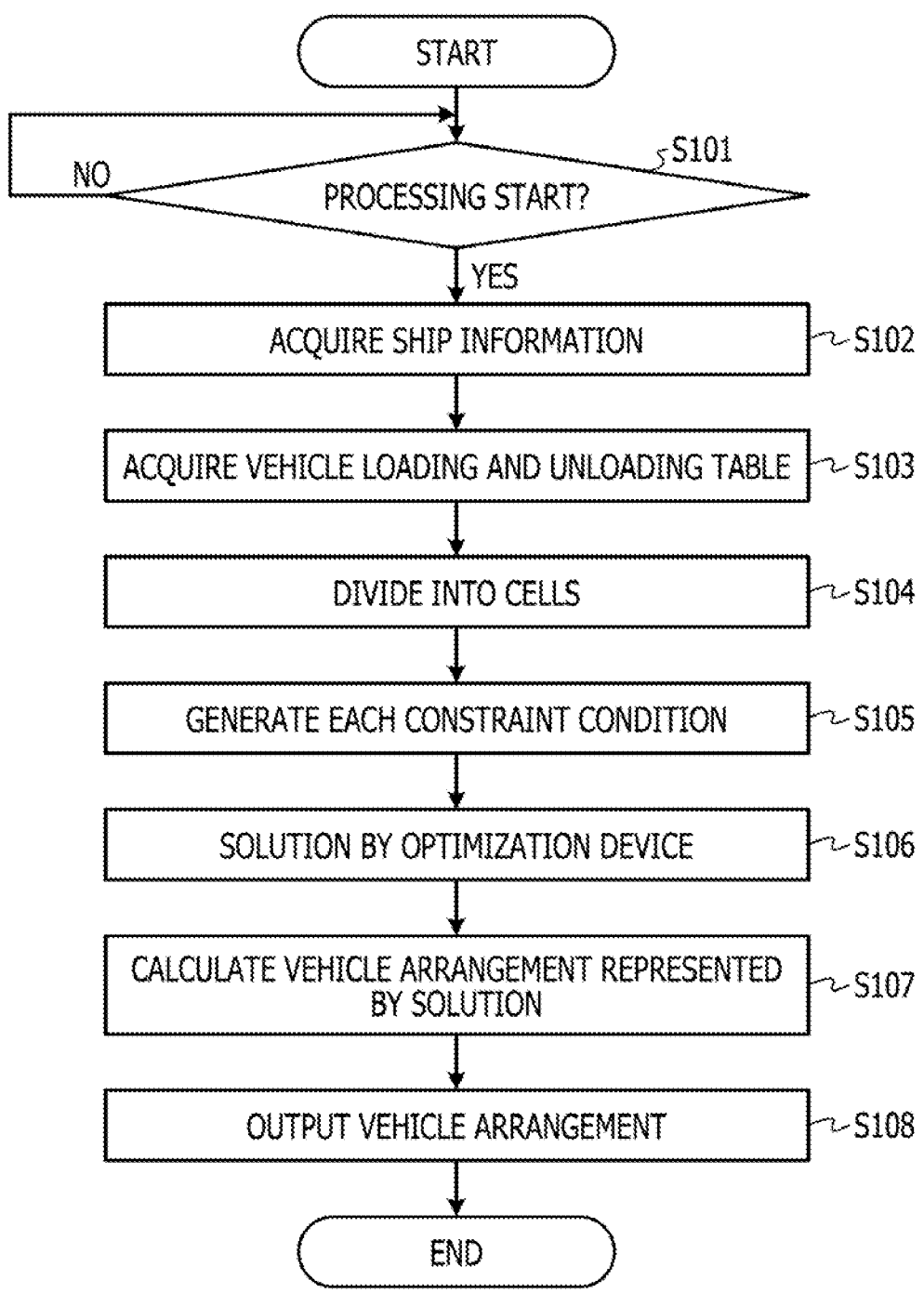
FIG. 10 is a flowchart illustrating a flow of optimization processing.

FIG. 10 is a flowchart illustrating a flow of optimization processing. As illustrated in FIG. 10, when the processing is started (S101: Yes), the reception unit 21 of the information processing device 10 acquires the ship information 14 (S102) and the vehicle loading and unloading table 15 (S103).

Subsequently, the cell division unit 22 divides each block into cells on the basis of the ship information 14 and the vehicle loading and unloading table 15 (S104), Then, the formulation unit 23 generates each constraint condition on the basis of the ship information 14 and the vehicle loading and unloading table 15 (S105).

Then, the optimization unit 24 generates an energy function to which each constraint condition is added, inputs the generated energy function to the optimization device 50, and acquires the result of solving by the optimization device 50 (S106). Thereafter, the output calculation unit 25 calculates the vehicle arrangement represented by the result (solution) of solving by the optimization device 50 (S107), and outputs the vehicle arrangement obtained by the calculation (S108).

[Effects]

As described above, the information processing device 10 regards the problem as a mathematical optimization problem, determines constraint conditions from the input data, and solves the problem using the optimization device. Thus, the information processing device 10 is capable of shortening the time taken for optimization even when vehicles are loaded and unloaded multiple times. For example, regarding a problem that would need 30 minutes to be manually solved, with the optimization device, vehicle arrangement satisfying the constraints can be obtained by the optimization device within about five minutes.

Furthermore, by introducing the weighting coefficient "$w_{ijkm}$", the information processing device 10 can arrange vehicles in the plurality of vehicle categories in one cell. As a result, the information processing device 10 can arrange a vehicle in the other vehicle category in an empty cell and can load all the vehicles in the vehicle loading and unloading table 15 on the ship.

FIG. 11 is a diagram for explaining effects. As illustrated in the upper diagram in FIG. 11, in a case where the weighting coefficient "$w_{ijkm}$", is not introduced, only one vehicle category can be arranged in one cell. That is, for example, in a case where 20 vehicles in a vehicle category A, 15 vehicles in a vehicle category B, and 10 vehicles in a vehicle category C are respectively arranged in cells 1, 2, and 3 in each of which 50 vehicles can be arranged, only the vehicle category A can be arranged in the cell 1, only the vehicle category B can be arranged in the cell 2, and only the vehicle category C can be arranged in the cell 3. Therefore, this causes free spaces for 30 vehicles in the cell 1, for 35 vehicles in the cell 2, and for 40 vehicles in the cell 3.

On the other hand, in a case where the weighting coefficient "$w_{ijkm}$" is introduced, the plurality of vehicle categories can be arranged in one cell That is, for example, in a case where 20 vehicles in the vehicle category A, 15 vehicles in the vehicle category B, and 10 vehicles in the vehicle category C are respectively arranged in the cells 1, 2, and 3 in each of which 50 vehicles can be arranged, 45 vehicles in total in the vehicle categories A, B, and C can be arranged in the cell 1. Therefore, it is possible to arrange the vehicles in the other vehicle categories in the cells 2 and 3, and increase the number of vehicles to be transported.

Here, a point will be described that an optimum solution with which the free space can be reduced is obtained by introducing the weighting coefficient "$w_{ijkm}$" using the constraint condition 3. For example, it is assumed that a state where 10 vehicles in a vehicle category (1) and 40 vehicles in a vehicle category (2) are arranged in a cell having a size for 50 vehicles be an optimum solution. When an energy value of the constraint condition 3 at that time is calculated, since the vehicles in two types of vehicle categories are arranged in one cell, Equation (14) is satisfied according to Equation (11) described above using a method not introducing the weighting coefficient $w_{ijkm}$. On the other hand, since weighting coefficients "$w_{ijkm}$" of the vehicle category (1) and the vehicle category (2) are respectively "02" and "0.8"

using the method for introducing the weighting coefficient "$w_{ijkm}$", Equation (15) is satisfied according to Equation (12) described above.

$$\left(\sum_{i=1}^{M}\sum_{j=1}^{N}x_{ijrs}\right)\left(\sum_{i=1}^{M}\sum_{j=1}^{N}x_{ijrs}-1\right)=(1+1)(1+1-1)=2 \quad (14)$$

$$\left(\sum_{i=1}^{M}\sum_{j=1}^{N}w_{ijrs}x_{ijrs}\right)\left(\sum_{i=1}^{M}\sum_{j=1}^{N}w_{ijrs}x_{ijrs}-1\right)= \quad (15)$$
$$(0.2\times 1+0.8\times 1)(0.2\times 1+0.8\times 1-1)=0$$

Therefore, the value of the energy is smaller when a weighting coefficient is used. Therefore, when the optimization device 50 obtains a solution, a possibility that the optimum solution is selected is low with a reference technique that does not use a weighting coefficient. However, with the method using the weighting coefficient, the possibility that the optimum solution is selected increases. Note that even with the reference technique, if the size of the cell is reduced, a possibility that the optimum solution can be obtained increases. However, since the optimum solution can be obtained even if the size of the cell is large with the method described in the embodiment described above, it is possible to realize reduction in a calculation amount.

Second Embodiment

While the embodiments have been described above, the embodiments may be implemented in various different modes in addition to the modes described above.

[Objective Function]

In order to improve stability of a vehicle transport ship, it is preferable to lower a position of the center of gravity of the vehicle transport ship as much as possible. Therefore, a formulation unit 23 generates an objective function used to calculate a degree of instability of the vehicle transport ship and can add the objective function to the energy function described above.

Here, the objective function will be described. For example, the formulation unit 23 defines a value $G_i$ indicating the degree of instability of the vehicle transport ship as a difference between a load capacity of decks on the upper half of the vehicle transport ship and a load capacity of decks on the lower half. In other words, for example, in the first embodiment, it is defined as "$G_i$=(load capacity of an area above the deck 4)—(load capacity of an area below the deck 3)". Therefore, $G_i$ when the vehicle transport ship leaves each port may be defined by Equation (16). For example, $G_1$ in Equation (16) corresponds to a degree of instability when the vehicle transport ship leaves a loading port A. As a result, the objective function may be expressed by Equation (17) using the average of $G_i$ $$G_1 = \sum_{i=1}^{1}\sum_{j=1}^{N}\left(\sum_{k=1}^{12}\sum_{m=1}^{S_k}b_{km}x_{ijkm}-\sum_{k=13}^{22}\sum_{m=1}^{S_k}b_{km}x_{ijkm}\right) \quad (16)$$

$$G_2 = \sum_{i=1}^{2}\sum_{j=1}^{N}\left(\sum_{k=1}^{12}\sum_{m=1}^{S_k}b_{km}x_{ijkm}-\sum_{k=13}^{22}\sum_{m=1}^{S_k}b_{km}x_{ijkm}\right)$$

...

-continued $$G_{M+N-2} = \sum_{i=1}^{M} \sum_{j=N-1}^{N} \left( \sum_{k=1}^{12} \sum_{m=1}^{S_k} b_{km} x_{ijkm} - \sum_{k=13}^{22} \sum_{m=1}^{S_k} b_{km} x_{ijkm} \right)$$

$$G_{M+N-1} = \sum_{i=1}^{M} \sum_{j=N}^{N} \left( \sum_{k=1}^{12} \sum_{m=1}^{S_k} b_{km} x_{ijkm} - \sum_{k=13}^{22} \sum_{m=1}^{S_k} b_{km} x_{ijkm} \right)$$

$$G = \frac{G_1 + G_2 + \cdots + G_{M+N-2} + G_{M+N-1}}{M + N - 1} \quad (17)$$

Then, by solving an optimization problem with constraint conditions by optimizing the objective function under conditions including a constraint condition 1, a constraint condition 2, and a constraint condition 3, an optimization unit 24 can calculate a solution that minimizes (lowers as possible) the degree of instability. With this configuration, since an information processing device 10 may automatically generate complicated constraint conditions, a time taken to optimize vehicle arrangement may be shortened.

[Another Example of Objective Function]

Another example of calculation of the center of gravity, which is an example of the degree of instability of the vehicle transport ship described above, will be described. Generally, when objects having masses $m_1, m_2, \ldots,$ and $m_n$ respectively exist on points $x_1, x_2, \ldots,$ and $x_n$, on the x axis, the center of gravity of the whole is represented by Equation (18).

$$x_g = \frac{m_1 x_1 + m_2 x_2 + \cdots + m_n x_n}{m_1 + m_2 + \cdots + m_n} \quad (18)$$

Here, a total weight of the existing vehicles is obtained for each block, and the center of gravity in the vertical direction is calculated using Equation (18). When it is assumed that a weight of one vehicle be p and a height from the bottom of the ship of a block k be H(k), the numerator of Equation (18) when leaving a certain port can be expressed as Equation (19). Furthermore, the denominator of Equation (18) is the total weight of weights of all the vehicles loaded on the ship and is a constant that does not depend on $x_{ijkm}$. This can be represented as in Equation (20).

$$\sum_{i,j} \sum_{k=1}^{R} \sum_{m=1}^{S_k} H(k) \rho b_{km} w_{ijkm} x_{ijkm} \quad (19)$$

$$\sum_{i,j} \sum_{k=1}^{R} \sum_{m=1}^{S_k} \rho b_{km} w_{ijkm} x_{ijkm} = \sum_{i,j} \rho c_{ij} \quad (20)$$

As a result described above, if the center of gravity at the time of leaving an n-th port is set to $G_n$, the formulation unit 23 can define $G_i$ at the time of leaving each port as Equation (21), and an objective function G can be represented by an average of $G_n$ as in Equation (22).

$$G_1 = \sum_{i=1}^{1} \sum_{j=1}^{N} \sum_{k=1}^{R} \sum_{m=1}^{S_k} H(k) \rho b_{km} w_{ijkm} x_{ijkm} / \sum_{i=1}^{1} \sum_{j=1}^{N} \rho c_{ij} \quad (21)$$

$$G_2 = \sum_{i=1}^{2} \sum_{j=1}^{N} \sum_{k=1}^{R} \sum_{m=1}^{S_k} H(k) \rho b_{km} w_{ijkm} x_{ijkm} / \sum_{i=1}^{2} \sum_{j=1}^{N} \rho c_{ij}$$

$$\vdots$$

$$G_{M+N-2} = \sum_{i=1}^{M} \sum_{j=N-1}^{N} \sum_{k=1}^{R} \sum_{m=1}^{S_k} H(k) \rho b_{km} w_{ijkm} x_{ijkm} / \sum_{i=1}^{M} \sum_{j=N-1}^{N} \rho c_{ij}$$

$$G_{M+N-1} = \sum_{i=1}^{M} \sum_{j=N}^{N} \sum_{k=1}^{R} \sum_{m=1}^{S_k} H(k) \rho b_{km} w_{ijkm} x_{ijkm} / \sum_{i=1}^{M} \sum_{j=N}^{N} \rho c_{ij}$$

$$G = \frac{G_1 + G_2 + \cdots + G_{M+N-2} + G_{M+N-1}}{M + N - 1} \quad (22)$$

Then, by solving an optimization problem with constraint conditions by optimizing the objective function under the conditions including the constraint condition 1, the constraint condition 2, and the constraint condition 3, the optimization unit 24 can calculate a solution that minimizes the degree of instability. With this configuration, since an information processing device 10 may automatically generate complicated constraint conditions, a time taken to optimize vehicle arrangement may be shortened.

[Numerical Values, Etc.]

The number of vehicles, the number of ports, the diagram illustrating the configuration inside the vehicle transport ship, etc. used in the above-mentioned embodiments are merely examples and may be arbitrarily changed. Furthermore, in the embodiments described above, an example has been described in which the block of the vehicle transport ship is divided into the plurality of cells. However, the embodiment is not limited to this, and one block may include one cell. Furthermore, as the optimization device 50 that performs optimization, an external device connected to the information processing device 10 using various buses, networks, or the like may also be used. Alternatively, a processor or the like built in the information processing device 10 may also be used. Note that various known methods are applicable as a method for optimizing the energy function or the objective function. Furthermore, an example of an index of the degree of instability is the center of gravity or the like.

[Cargo]

In the embodiments described above, the vehicle transport ship has been described as an example. However, the embodiments are not limited thereto, and various cargoes and spaces such as a multi-story warehouse, a flat parking space, and a cargo storage may be used as targets. Note that a cargo is not limited to a vehicle, and various kinds of deliveries such as cardboard boxes may be treated in the same manner.

[System]

Pieces of information including a processing procedure, a control procedure, a specific name, and various types of data and parameters described above or illustrated in the drawings may be optionally changed unless otherwise specified.

Furthermore, each component of each device illustrated in the drawings is functionally conceptual and does not necessarily have to be physically configured as illustrated in the drawings. In other words, for example, specific forms of distribution and integration of each device are not limited to those illustrated in the drawings. That is, for example, all or a part of the devices may be configured by being functionally or physically distributed and integrated in optional units according to various types of loads, usage situations, or the like. Note that the reception unit 21 is an example of a reception unit, the cell division unit 22 is an example of a setting unit, the formulation unit 23 is an example of a generation unit, and the optimization unit 24 and the output calculation unit 25 are examples of a determination unit.

Moreover, all or any part of each processing function performed in each device may be achieved by a central processing unit (CPU) and a program analyzed and executed by the CPU, or may be achieved as hardware by wired logic.

[Hardware]

Figure 12:
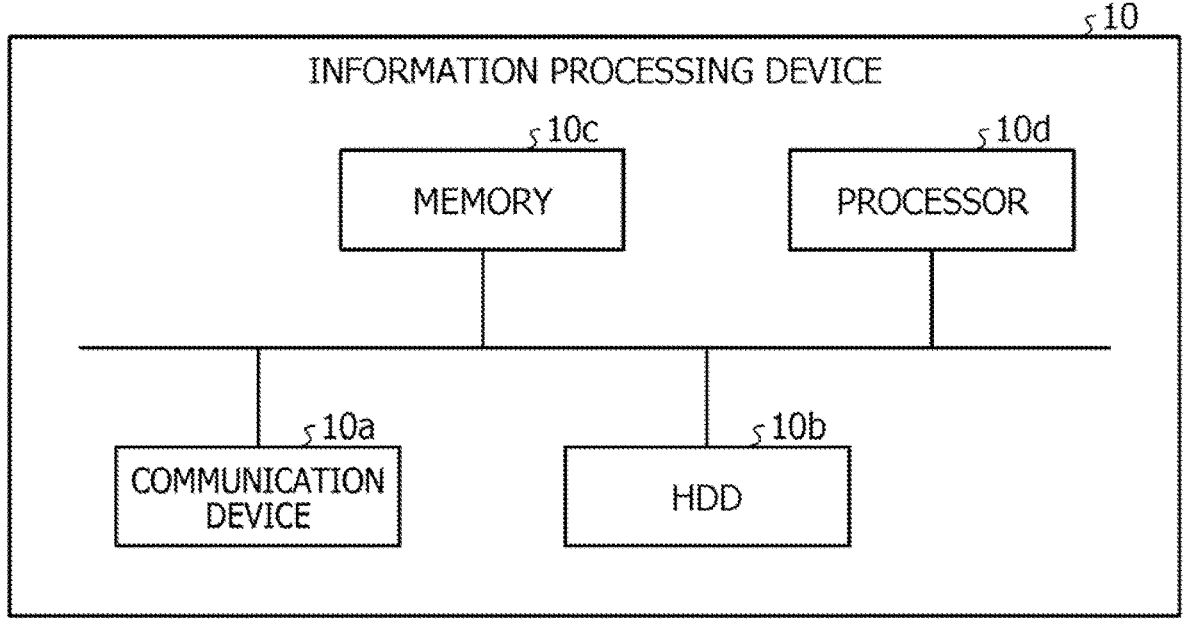
FIG. 12 is a diagram for explaining a hardware configuration example.

Next, a hardware configuration example of the information processing device 10 will be described. FIG. 12 is a diagram for explaining a hardware configuration example. As illustrated in FIG. 12, the information processing device 10 includes a communication device 10a, a hard disk drive (HDD) 10b, a memory 10c, and a processor 10d. Furthermore, the units illustrated in FIG. 7 are interconnected by a bus or the like.

The communication device 10a is a network interface card or the like and communicates with another server. The HDD 10b stores programs for operating the functions illustrated in FIG. 3 and DBs.

The processor 10d reads a program that executes processing similar to that of each processing unit illustrated in FIG. 3 from the HDD 10b or the like to develop the read program in the memory 10c, thereby operating a process for executing each function described with reference to FIG. 3 or the like. For example, this process executes a function similar to that of each processing unit included in the information processing device 10. Specifically, for example, the processor 10d reads programs having the same functions as the reception unit 21, the cell division unit 22, the formulation unit 23, the optimization unit 24, the output calculation unit 25, or the like from the HDD 10b or the like. Then, the processor 10d executes a process for executing processing similar to the processing of the reception unit 21, the cell division unit 22, the formulation unit 23, the optimization unit 24, the output calculation unit 25, or the like.

As described above, the information processing device 10 operates as an information processing device that executes the optimization method by reading and executing a program. Furthermore, the information processing device 10 may also implement functions similar to the functions of the above-mentioned embodiments by reading the program described above from a recording medium by a medium reading device and executing the read program described above. Note that the program referred in other embodiments is not limited to being executed by the information processing device 10. For example, the embodiments may be similarly applied to a case where another computer or server executes the program, or a case where such a computer and server cooperatively execute the program.

This program may be distributed via a network such as the Internet. In addition, this program is recorded on a computer-readable recording medium such as a hard disk, flexible disk (FD), compact disc-read only memory (CD-ROM), Magneto-Optical disk (MO), or Digital Versatile Disc (DVD), and can be executed by being read from the recording medium by the computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention.

Although one or more embodiments of the present invention have been described in detail, it should be understood that the various changes, substitutions, and alterations could be made hereto without departing from the spirit and scope of the invention.

What is claimed is:

1. An information processing device coupled to an optimization device, the information processing device comprising:
a memory configured to store, for each of a plurality of places, space information and demand information, the space information being information defining a target space in which a cargo is placed at that place, the target space defined in the space information including a plurality of sections obtained by dividing the target space, the demand information being information including an amount corresponding to a number of cargos to be loaded to the target space at that place, wherein the space information includes, for each of the plurality of sections, a route from that section to an entrance of the target space, and a maximum load capacity; and
a processor circuit coupled to the memory, the processor circuit being configured to perform processing, the processing including:
obtaining, for each of the plurality of places, the space information from the memory;
executing, for each of the plurality of places, a setting processing configured to set, for each of the plurality of sections indicated by the space information for that place, a coefficient in response that the amount included in the demand information for that place is less than the maximum load capacity included in the space information for that section, the coefficient being obtained by dividing that amount by that maximum load capacity;
executing, for each of the plurality of places, a generation processing configured to
generate, for each of the plurality of sections indicated by the space information for that place by using the space information for that section and the demand information for that place, a first constraint condition requiring that another cargo does not exist on a route to be used for loading or unloading a cargo from or to the entrance of the target space, a second constraint condition that indicates the number of cargoes to be loaded and the number of cargoes to be unloaded which are calculated using the coefficient set for that section, and a third constraint condition that indicates an adjusted maximum load capacity by multiplying the coefficient set for that section by the maximum load capacity included in the space information for that section;
generate an energy function by using the first constraint condition, the second constraint condition, the third constraint condition, and an objective function for calculating a degree of instability of the target space; and
execute a determination processing configured to
input the generated enemy function to the optimization device to cause the optimization device to search a solution of the energy function that minimizes the degree of instability of the target space under the first constraint condition, the second constraint condition, and the third constraint condition, and
determine, based on the solution searched by the optimization device, a cargo arrangement in the target space.

2. The information processing device according to claim 1, wherein the setting processing is configured to calculate the number of the plurality of regions using the number of plurality of sections and the number of cargoes to be arranged and sets the coefficient for each of the calculated region.

3. The information processing device according to claim 1, wherein the setting processing is configured to calculate, for each of the plurality of regions, the coefficient using the maximum load capacity of the region and the number of cargoes to be arranged in the region based on the space information.

4. The information processing device according to claim 1, wherein the determination processing is configured to input an energy function based on a sum of the first constraint condition, the second constraint condition, and the third constraint condition to an Ising machine and determines the arrangement using a solution result by the Ising machine.

5. An optimization method implemented by a computer coupled to an optimization device, the method comprising:
receiving, for each of a plurality of places, space information from a memory configured to store, for each of the plurality of places, the space information and demand information, the space information being information defining a target space in which a cargo is placed at that place, the target space defined in the space information including a plurality of sections obtained by dividing the target space, the demand information being information including an amount corresponding to a number of cargoes to be loaded to the target space at that place, wherein the space information includes, for each of the plurality of sections, a route from that section to an entrance of the target space, and a maximum load capacity;
executing, for each of the plurality of places, a setting processing configured to set, for each of the plurality of sections indicated by the space information for that place, a coefficient in response that the amount included in the demand information for that place is less than the maximum load capacity included in the space information for that section, the coefficient being obtained by dividing that amount by that maximum load capacity;
executing, for each of the plurality of places, a generation processing configured to
generate, for each of the plurality of sections indicated by the space information for that place by using the space information for that section and the demand information for that place, a first constraint condition requiring that another cargo does not exist on a route to be used for loading or unloading a cargo from or to the entrance of the target space, a second constraint condition that indicates the number of cargoes to be loaded and the number of cargoes to be unloaded which are calculated using the coefficient set for that section, and a third constraint condition that indicates an adjusted maximum load capacity by multiplying the coefficient set for that section by the maximum load capacity included in the space information for that section; and
generate an enemy function by using the first constraint condition, the second constraint condition, the third constraint condition, and an objective function for calculating a degree of instability of the target space; and
execute a determination processing configured to
input the generated energy function to the optimization device to cause the optimization device to search a solution of the energy function that minimizes the degree of instability of the target space under the first constraint condition, the second constraint condition, and the third constraint condition, and
determine, based on the solution searched by the optimization device, a cargo arrangement in the target space.

6. A non-transitory computer-readable storage medium for storing an optimization program which causes a processor coupled to an optimization device to perform processing, the processing comprising:
receiving, for each of a plurality of places, space information from a memory configured to store, for each of the plurality of places, the space information and demand information, the space information being information defining a target space in which a cargo is placed at that place, the target space defined in the space information including a plurality of sections obtained by dividing the target space, the demand information being information including an amount corresponding to a number of cargoes to be loaded to the target space at that place, wherein the space information includes, for each of the plurality of sections, a route from that section to an entrance of the target space, and a maximum load capacity;
executing, for each of the plurality of places, a setting processing configured to set, for each of the plurality of sections indicated by the space information for that place, a coefficient in response that the amount included in the demand information for that place is less than the maximum load capacity included in the space information for that section, the coefficient being obtained by dividing that amount by that maximum load capacity;
executing, for each of the plurality of places, a generation processing configured to
generate, for each of the plurality of sections indicated by the space information for that place by using the space information for that section and the demand information for that place, a first constraint condition that requiring that another cargo does not exist on a route to be used for loading or unloading a cargo from or to the entrance of the target space, a second constraint condition that indicates the number of cargoes to be loaded and the number of cargoes to be unloaded which are calculated using the coefficient set for that section, and a third constraint condition that indicates an adjusted maximum load capacity by multiplying the coefficient set for that section by the maximum load capacity included in the space information for that section; and
generate an energy function by using the first constraint condition, the second constraint condition, the third constraint condition, and an objective function for calculating a degree of instability of the target space; and
execute a determination processing configured to
input the generated enemy function to the optimization device to cause the optimization device to search a solution of the energy function that minimizes the degree of instability of the target space under the first constraint condition, the second constraint condition, and the third constraint condition, and
determine, based on the solution searched by the optimization device, a cargo arrangement in the target space.

* * * * *